United States Patent [19]

Faber

[11] 3,908,255
[45] Sept. 30, 1975

[54] PIN-TYPE CLAMPING DEVICE FOR CUTTING INSERTS IN TOOL HOLDERS

[75] Inventor: Kurt Heinrich Albert Erich Faber, Sandviken, Sweden

[73] Assignee: Sandvik Aktiebolag, Sandviken, Sweden

[22] Filed: Jan. 3, 1975

[21] Appl. No.: 538,373

Related U.S. Application Data

[63] Continuation of Ser. No. 418,218, Nov. 23, 1973, abandoned.

[30] Foreign Application Priority Data

Dec. 13, 1972 Sweden............................ 16243/72

[52] U.S. Cl. ............................................. 29/96
[51] Int. Cl.² ........................................ B26D 1/00
[58] Field of Search ............................... 29/96

[56] References Cited
UNITED STATES PATENTS

| | | | |
|---|---|---|---|
| 3,137,059 | 6/1964 | Hertel | 29/96 |
| 3,314,126 | 4/1967 | Stier | 29/96 |
| 3,341,920 | 9/1967 | Kelm | 29/96 |

Primary Examiner—Leonidas Vlachos
Attorney, Agent, or Firm—Pierce, Scheffler & Parker

[57] ABSTRACT

A pin-type tool holder has a device for clamping a cutting insert in the holder, said clamping device including an angular lever arm having a clamping pin on one shank and a tensioning device on the other shank. The clamping pin has a clamping projection which passes on said insert from above. The lever arm has a fulcrum in the form of a contact point abutting and slideable along a surface on the holder.

6 Claims, 4 Drawing Figures

PIN-TYPE CLAMPING DEVICE FOR CUTTING INSERTS IN TOOL HOLDERS

This is a continuation, of application Ser. No. 418,218 filed Nov. 23, 1973 and now abandoned.

This invention relates to tool holders for lathes and similar machine tools, and is concerned with the provision of an improved pin-type device for clamping a cutting insert in a tool holder.

In tool holders — such, for instance as turning tools or milling cutters with a clamping device of the pin type — a cutting insert is clamped laterally parallel with a bottom support surface by means of a pin which presses the insert against a side support in the tool holder. In vertical direction, perpendicularly to the bottom support surface, usually no clamping device is needed, because the friction between the pin and the insert gives a sufficient passive resistance to prevent unwanted raising of the insert. In certain types of load, however, the raising force acting on the insert is great enough to raise the insert from the bottom support surface, and the insert is broken. To meet such a situation it had been proposed to provide — in addition to the pin — an extra clamping device which clamps the insert from above.

Two clamping devices entail certain disadvantages: the construction is more complicated, and exchange of inserts takes more time. Attempts have been made to solve the problem by forming the pin as a screw with a threaded shank and a head having a conical abutment surface. However, this solution was not entirely satisfactory, as it was difficult to obtain a sufficient space between the pin and the side support for replacing the insert without screwing away the pin. Moreover, this device required precise manufacturing tolerances.

The present invention provides a clamping device which gives an effective clamping both laterally and vertically. This is attained by using an angular lever arm, one shank of which forms the clamping pin and enters a hole in the cutting insert, whilst the other shank cooperates with means for initiating the clamping force, usually a screw. The novelty according to the invention is that the lever arm abuts and slides along a surface that is orientated substantially vertically, the abutting point forming the fulcrum of the lever arm. At the same time the pin that enters into the insert has a lateral projection, which urges the insert against the bottom support surface therefor provided on the tool holder, at the same time as the pin urges the insert laterally. By the freedom of movement vertically of the fulcrum the clamping movements towards the side support and the bottom support are independent of each other. Thus there is realized a statically determined system providing clamping in both directions. The said freedom of movement also has the advantage of greater manufacturing tolerances for dimensions in the vertical direction, among them the thickness of the cutting insert.

An embodiment of the invention is described in the following specification taken with the appended drawing, in which.

Figure 1:
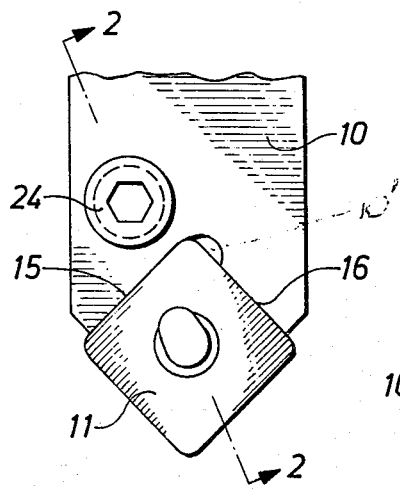
FIG. 1 is a top view of the insert site in a pin holder according to the invention.
Figure 2:
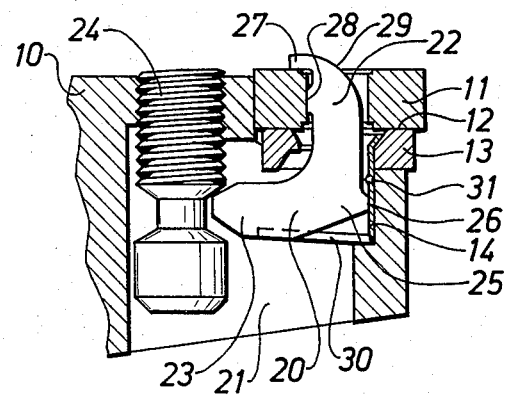
FIG. 2 is a section line 2-2 in FIG. 1.

The holder in FIGS. 1 and 2 consists of a holder shank 10 with a site 10' for a cutting insert 11, which latter is clamped by a clamping device. The bottom surface 12 of the insert site 10' is formed by a bottom plate 13 which is fastened by means of a resilient tubular pin 14 entering into bores in the bottom plate and the holder shank. The surfaces 15 and 16 form the side support of the insert site.

Insert 11 is clamped by means of an angular lever arm 20 which is situated in a recess 21 in the holder shank below insert site 10'. One shank 22 of the lever arm extends substantially vertically, perpendicularly to the bottom support surface 12, and forms the pin that clamps the insert and extends through a central bore in the bottom support plate and the insert. The other shank 23 of said lever arm extends substantially horizontally, in the same direction as the bottom support surface 12. A clamping screw 24 acts on the free end of shank 23.

Lever arm 20 is provided with a projection 25 which abuts the surface 26 on the inside of the recess 21,— in the illustrated embodiment the tubular pin 14. The upper end of the pin has a projection 27 extending laterally over the upper surface of the insert and another projection 28 extending laterally against the bore in the insert.

Insert 11 is clamped against said site by tensioning the screw 24 so that the lever arm 23 is urged downwardly. This has the double effect that (a) the arm 20 is rotated with the projection 25 as a fulcrum, and at the same time (b) slides with the projection 25 along the surface 26. The result is that the projection 27 is urged against the top side of the insert and the projection 28 is urged against the inside of the bore in the insert, so that the insert is clamped both vertically and laterally.

For loosening the insert the screw 24 is turned in the opposite direction. In order to facilitate removal of the insert, the upper part of the pin is rounded along the portion 29. During the loosening the lever arm 20 is maintained in its position by a spring 30 which rests on a shoulder in the recess 21 and urges the lever arm upwardly to a position in which the projection 25 abuts a bulge 31 on the inside of the bore 21,— in the illustrated case, the tubular pin 14.

Figure 3:
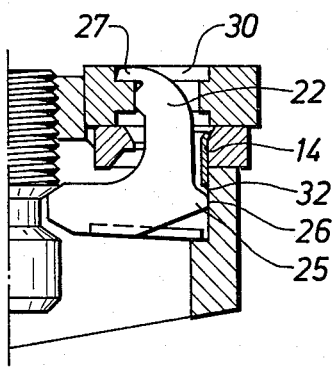
FIGS. 3 and 4 show modified embodiments of the same section as in FIG. 2.

FIG. 3 shows an embodiment with certain details modified. The upper projection 27 on the pin has been countersunk in an annular recess 30 in the cutting insert, so that no part of pin 22 projects above the top surface of the insert. The tubular pin 14 is shorter, so that the projection 25 abuts directly the wall in recess 21. The bulge 31 in FIG. 2 here corresponds to the lower edge 32 of the tubular pin.

Figure 4:
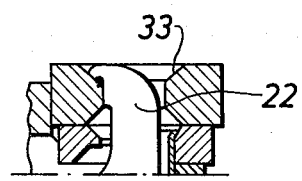

FIG. 4 shows a further modification of FIG. 3, in which the shoulder-shaped recess 30 is replaced by an obliquely inclined recess 33 around the bore of the insert. Also in this case pin 22 is wholly countersunk below the top surface of the insert.

If the described clamping device is used in a milling cutter it may be desirable to direct the clamping screw 24 perpendicularly to the section plane in FIG. 2, and to provide the screw with a conical surface acting from above on the shank 23.

I claim:

1. In a clamping device for a pin-type tool holder including an angular lever arm shank of which forms a clamping pin, the other shank extending sideways from said one shank and being actuated by a clamping screw, the improved construction wherein the remote end of the clamping pin has a lateral clamping projection (27) actuating on a cutting insert from above, and wherein the lever arm has a fulcrum formed by a contact point (25) on said lever arm which fulcrum is located at the junction of said shanks, and abuts and is downwardly slideable, during the clamping action by axial movement of said clamping screw, along a sliding surface (26) extending substantially in the same direction as said clamping pin, whereby pressure from said clamping screw is directly transferred in the said direction to said clamping projection.

2. Clamping device as defined in claim 1, in which the fulcrum of the lever arm is formed by a lateral fulcrum projection (25).

3. Clamping device as defined in claim 2, wherein said fulcrum projection (25) on the lever arm abuts an abutment (31, 32).

4. Clamping device as defined in claim 1, in which such cutting insert is supported by a bottom support plate held by a tubular pin (14) in said holder shank, and in which a sliding surface (26) lies below said tubular pin (14) whilst the lower edge of the tubular pin forms said abutment (32).

5. Clamping device as defined in claim 1, wherein a sliding surface (26) lies on the inside of a tubular pin (14) and wherein a bulge (31) in the tubular pin forms the abutment.

6. In a clamping device for a pin-type tool holder including an angular lever arm one shank of which forms a clamping pin, the other shank extending sideways from said one shank and being actuated by a tensioning device, the improved construction wherein the remote end of the clamping pin has a lateral clamping projection (27) acting on a cutting insert from above, and wherein the lever arm has a fulcrum formed by a contact point (25) on said lever arm which fulcrum is located at the junction of said shanks, and abuts and is downwardly slideable during the clamping action along a sliding surface (26) extending substantially in the same direction as said clamping pin, said device being further characterized in that a spring (30) is arranged to urge said lever arm upwardly against an abutment (31,32) when the clamping device is untensioned.

* * * * *